United States Patent [19]

Tarafdar

[11] Patent Number: 5,313,707
[45] Date of Patent: May 24, 1994

[54] WATERMELON SEED REMOVER

[76] Inventor: Martin A. Tarafdar, P.O. Box 749, Crystal Bay, Nev. 89402

[21] Appl. No.: 53,744

[22] Filed: Apr. 29, 1993

[51] Int. Cl.$^5$ .............................................. B26B 3/00
[52] U.S. Cl. ........................................ 30/315; 30/114
[58] Field of Search ...................... 30/315, 316, 113.1, 30/113.2, 114

[56] References Cited

U.S. PATENT DOCUMENTS

| | | | |
|---|---|---|---|
| 2,238,425 | 4/1941 | Morris | 30/315 |
| 2,841,868 | 7/1958 | O'Brien | 30/114 |
| 2,990,615 | 7/1961 | Ohler | |
| 4,296,659 | 10/1981 | Nauman | 30/315 X |
| 4,365,415 | 12/1982 | Pustoch | 30/314 |
| 4,763,414 | 8/1988 | McNeill, II | 30/113.1 |

Primary Examiner—Douglas D. Watts
Attorney, Agent, or Firm—Lothrop & West

[57] ABSTRACT

A suitably dimensioned, hollow, crescent-shaped die with an upstanding handle provides a culinary tool for conveniently and quickly removing all the seeds from a watermelon. Upright side walls on the perimeter of the die engage each of the seed-bearing, crescent-shaped-in-section columns and extract the column as the die is withdrawn at the conclusion of the cutting portion of the cycle. By arranging a portion of the die and side walls in an overlapping relation, the areal extent of the die can be expanded, after withdrawal, to allow the attendant seed-bearing column to drop from the die by gravity. If desired, the overlapping portion can be augmented by slots and a pair of retainer pins to restrict the extent of change of the die area to a predetermined range; and inward shark tooth projections on the side walls can be used to enhance the ability of the side walls to lift the column during die withdrawal. A spring-loaded cross-tong attached to the side walls can serve not only as a handle but also as a die expander to release a seed-bearing column at the conclusion of the seed-removal cycle.

7 Claims, 3 Drawing Sheets

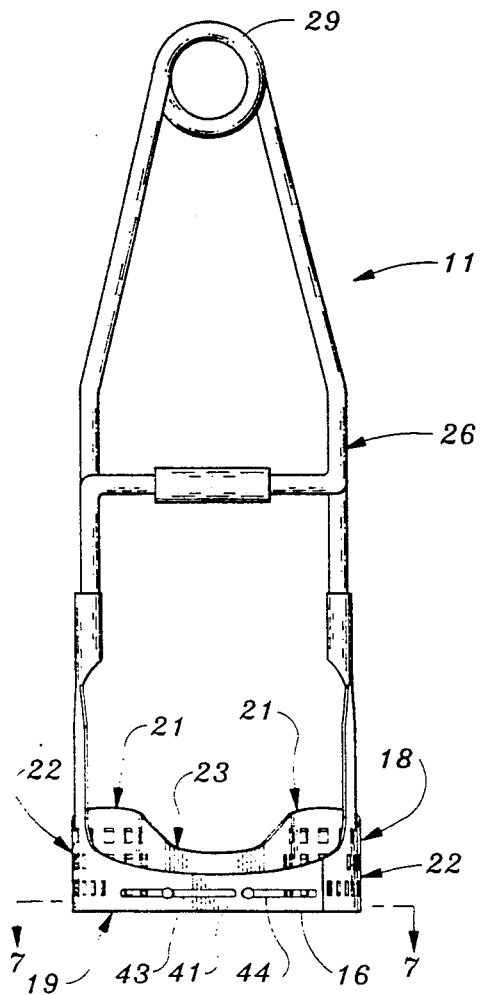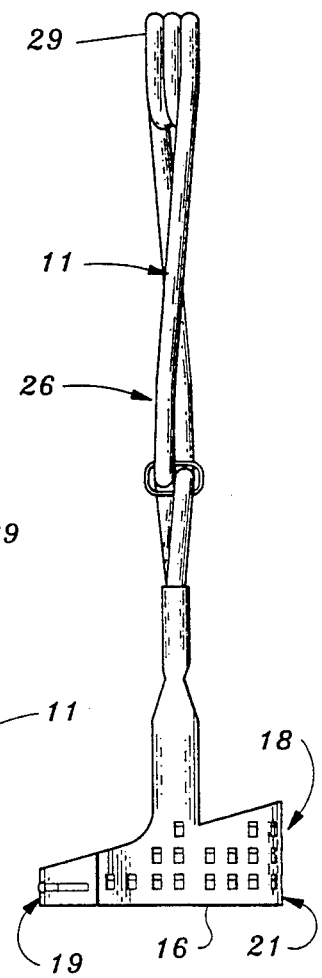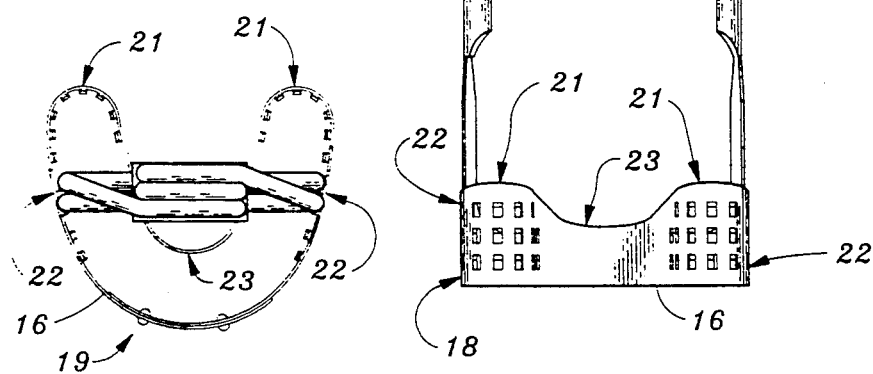
Fig. 3
Fig. 4
Fig. 6
Fig. 5

WATERMELON SEED REMOVER

FIELD OF THE INVENTION

The present invention is in the field of culinary accessories.

BACKGROUND OF THE INVENTION

The present invention takes advantage of the fact that watermelon seeds are arranged in six elongated columns symmetrically disposed about the longitudinal axis of the melon. More specifically, each of the columns is crescent-shaped in cross-section, with the seeds dispersed within the flesh of the melon but invariably located within the confines of the crescent-shaped imaginary envelope of the elongated column.

PRIOR ART

A preliminary search turned up the following U.S. Pat. Nos.:

| Ohler | No. 2,990,615 | July 4, 1961 |
| Pustoch | No. 4,365,415 | Dec. 28, 1982 |
| McNeill | No. 4,763,414 | Aug. 16, 1988 |

Ohler discloses a tubular, fruit and vegetable coring tool having serrations at the leading end to facilitate penetration.

Pustoch provides a notched blade with a finger engaging handle for repeatedly piercing the rind of a melon and thereby producing a zig-zag edge on a decoratively-cut melon basket, or the like.

McNeill illustrates a torpedo-shaped handle with a circular or other geometric ring projecting from opposite ends to cut an elongated core or channel from the full length of a banana, zucchini or other elongated fruit or vegetable to provide a space for an appropriate filling, such as cream cheese, for example.

These patents neither anticipate nor render obvious the construction, operation or result of the present invention.

SUMMARY OF THE INVENTION

A hollow, crescent-shaped die is sized and shaped to encompass the customary imaginary envelope formed by the seeds in six separate crescent-shaped columnar groupings surrounding the axis of the customary watermelon. A handle is mounted on the die to facilitate manipulation.

After the melon is cut, the die is maneuvered into position congruent with each of the seed columns and urged into the flesh of the melon, cutting a crescent-shaped-in-section column as it penetrates the melon.

As the die is withdrawn the seed-bearing column is concurrently extracted. The die is thereupon expanded by squeezing on the upper arms of the handle constructed as a cross-tong with the lower arms connected to the die which includes a relatively slidable overlapped portion. When the die is enlarged the seed-bearing column drops out of the die by gravity. Each of the six seed-bearing columns is similarly removed and discarded. The remaining flesh of the watermelon is seed-free.

BRIEF DESCRIPTION OF THE DRAWING FIGURES

FIG. 3 is a front elevation of the device to a slightly reduced scale;

FIG. 4 is an elevational view of one side, the opposite side being a mirror image;

FIG. 5 is a rear elevation;

FIG. 6 is a top plan;

DETAILED DESCRIPTION OF THE INVENTION

Figure 1:
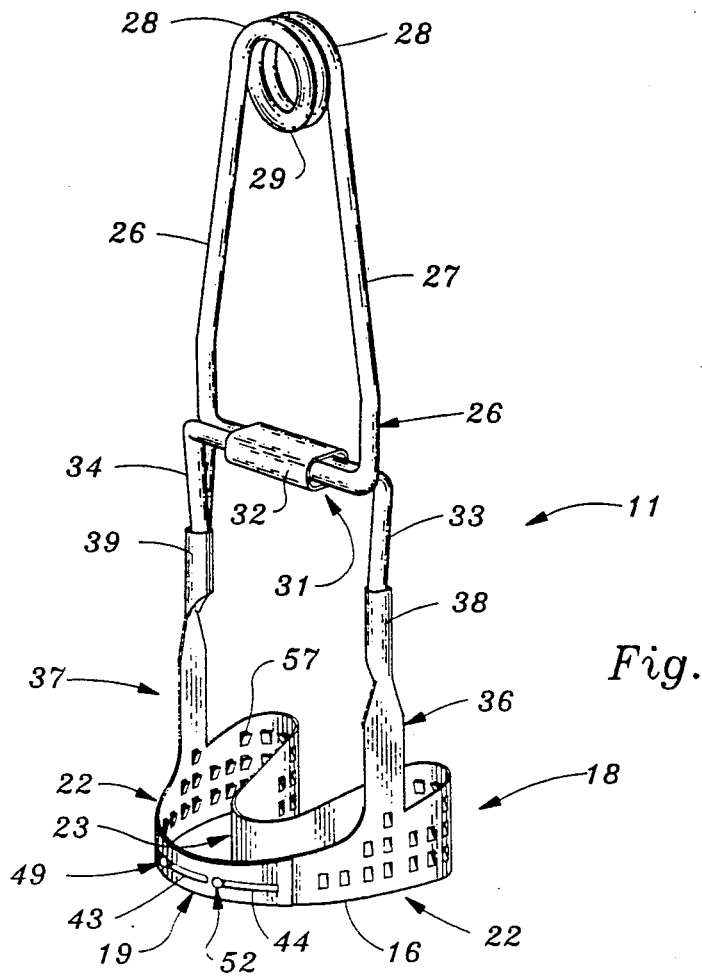
FIG. 1 is a front perspective view of the watermelon seed remover.

While the watermelon seed remover of the invention, generally designated by the reference numeral 11, is susceptible of various different embodiments, it has successfully been embodied in the form disclosed herein.

In order to cut, from a watermelon slice 12, the crescent-shaped, seed-bearing columns 13 contained in the slice, a hollow, crescent-shaped die 14 is provided.

The die 14 is sized and shaped to equal or slightly exceed, in size, the congruent imaginary envelope defining the seed-bearing, crescent-shaped column 13.

The die 14 is constructed, preferably, of thin, stainless, spring steel material and therefore provides a sharp, bottom, or cutting, edge 16 which is very effective in penetrating the relatively soft flesh 17 of a mature watermelon.

The die 14 includes upstanding side walls 18 having a relatively low, front portion 19 in which the side walls overlap, as clearly appears in FIGS. 6-9. The upstanding side walls 18 also comprise a pair of relatively high, rear portions 21 and a pair of opposite lateral side portions 22 of intermediate height. Completing the side walls 18 and forming the indented portion of the crescent is a U-shaped wall portion 23, also of intermediate height.

In order to hold the die 14 and, conveniently, to manipulate the die, an upright handle 24 is mounted on the die. The handle is preferably in the form of a cross-tong in which an opposed pair of upper arms 26 and 27 are pivotally connected at their upper ends 28 by a helical spring 29.

The spring-loaded upper arms 26 and 27 tend to diverge under force of the spring 29. Thus, owing to the arm-crossing connection 31, enclosed within a sleeve 32, a respective pair of lower arms 33 and 34 are spring-urged inwardly toward each other by the spring 29.

The bottom ends of the lower arms 33 and 34 are connected to the opposed lateral side portions 22 of the die side walls 18 by a pair of upright posts 36 and 37, respectively. The physical connection is effected by tightly crimping the respective sleeves 38 and 39, formed in the tops of the posts 36 and 39, around the bottom ends of the lower arms 33 and 34. The posts 36 and 37 can, if desired, be integral upward extensions of the lateral side portions 22 of the upstanding side walls 18 and would therefore also be fabricated of stainless steel material.

The inward urgency of the lower arms 33 and 34 is imposed on the respective posts 36 and 37 and, therefore, on the lateral side portions 22 of the die side walls 18, tending to compress or reduce the areal size of the crescent-shaped die.

In the front overlapping portion 19 of the die side walls 18 there is a slip fit connection, which is best illustrated in FIGS. 3, 7, 8 and 9. This construction allows the die 14 to be contracted and expanded under the control of the user of the tool.

The overlapping portion 19 of the die side walls 18 includes an outer tongue 41, formed by a forward extension of the left-hand wing of the die 14, as viewed from the front, as in FIG. 3, and an inner tongue 42, formed by a forward extension of the right hand wing of the die 14, as viewed from the front.

Figure 8:
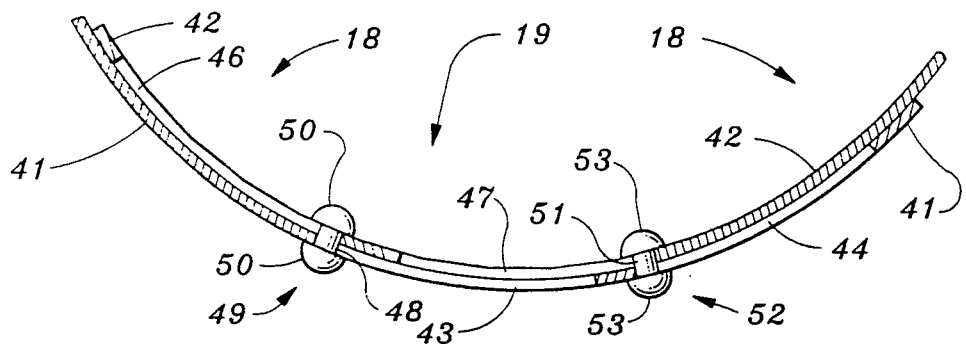
FIG. 8 is a fragmentary sectional view, to a greatly enlarged scale, showing the die's overlapping side-wall portion in base, or fully contracted position; and, FIG. 9 is a view similar to FIG. 8, but with the die in fully expanded position.
Figure 9:
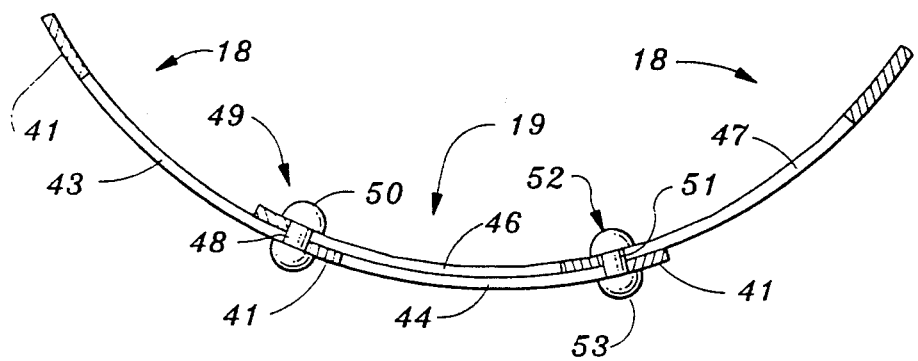

Formed in the outer tongue 41 are two horizontal slots 43 and 44 (see FIGS. 8 and 9). In at least partial register with the outer slots 43 and 44 are horizontal slots 46 and 47 formed in the inner tongue 42.

Spanning the respective slots 43 and 46 is the shank 48 of a pin 49. In like fashion, the shank 51 of a pin 52 spans the slots 44 and 47.

A pair of heads 50 on opposite ends of the pin 49 and a pair of heads 53 on the pin 52, snugly but slidingly accommodate relative horizontal motion between the outer tongue 41 and the inner tongue 42.

Since the urgency of the helical spring 29 tends to compress the lateral sides 22 inwardly toward each other, as previously explained, the slip fit connection of the outer tongue 41 and inner tongue 42 allows the areal extent of the crescent-shaped die 14 to be reduced to a desired amount, determined by the geometry of the slots in the tongues 41 and 42.

FIGS. 1, 3, 7 and 8 illustrate the maximum compressed position of the die 14. As shown most clearly in FIG. 8, the shanks 48 and 51 of the respective pins 49 and 52 abut the left-hand marginal edges of the slots 43 and 44 as well as the right-hand marginal edges of the slots 46 and 47. The overlapping tongues 41 and 42 are thereby blocked from any further compressive motion tending to reduce the areal extent of the die 14.

Figure 2:
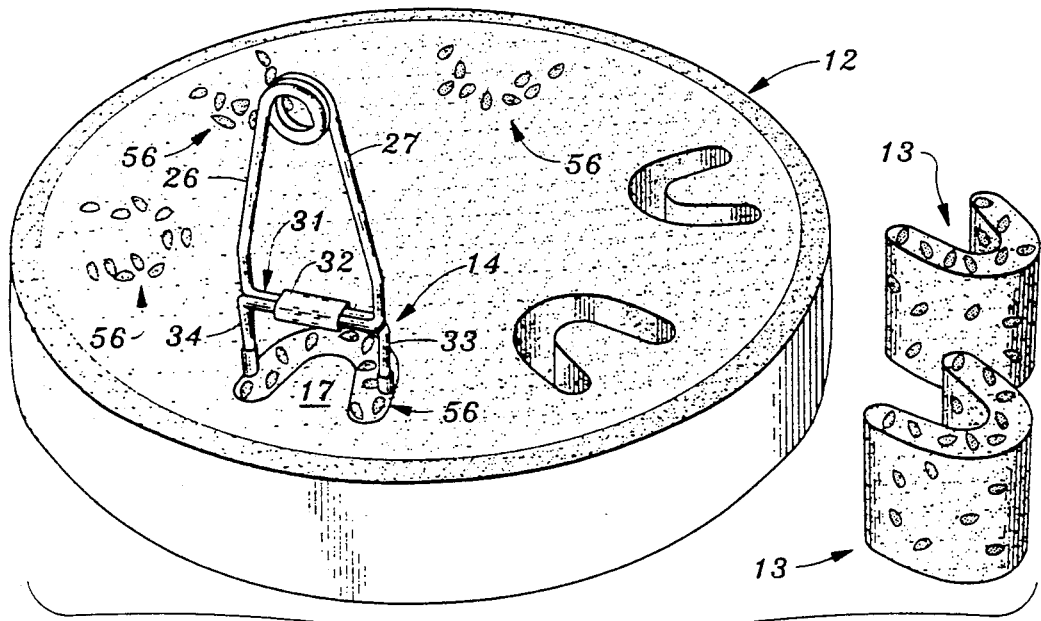
FIG. 2 is a rear perspective view, to a reduced scale, of the upper portion of the seed remover, the lower portion being embedded in the flesh of a watermelon slice preparatory to being removed, and showing two seed-bearing columns previously removed.
Figure 7:
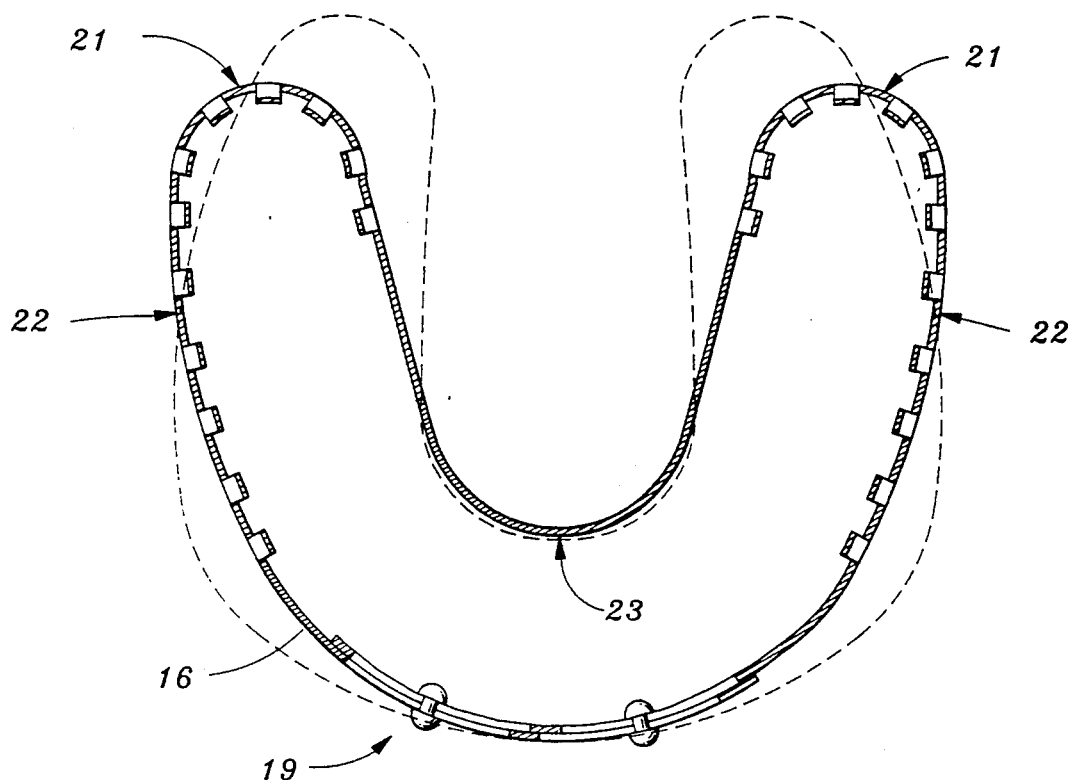
FIG. 7 is a sectional view, to an enlarged scale, the plane of the section being taken on the line 7—7 in FIG. 3, the broken lines indicating the size and shape of the die in fully expanded position.

It is while the die is in maximum compressed position that the tool is inserted into the melon slice, as appears in FIG. 2, with the crescent-shaped die in congruent relation with the crescent-shaped seed pattern 56 on the exposed surface of the melon slice 12. The tool 11 is preferably pushed vertically downwardly, by the user, far enough to encompass the full length of the seed-bearing column 13 and then vertically withdrawn.

The friction between the die side walls 18 and the engaging side surfaces of the seed-bearing column 13 is such that the column accompanies the die. To enhance the friction, a plurality of small inwardly directed projections can be formed in the side walls. In deluxe models, as appears in the embodiment depicted herein the projections 57 can be of the shark's tooth type in which the side walls readily cut downwardly to outline the column 13 and, when being withdrawn, "bite into" the column and positively lift the column.

Upon withdrawing the die 14 and accompanying seed-bearing column 13, its is desirable to separate the column from the die in order to proceed to the next seed grouping.

Separation of the column 13 from the die 14 is most readily effected by opening or increasing the areal extent of the die. This is accomplished by grasping the upper arms 26 and 27 in the palm of the hand and squeezing the upper arms toward each other against the outward urgency of the helical spring 29.

Owing to the cross-connection construction 31, squeezing the upper arms 26 and 27 toward each other causes the lower arms 33 and 34 to draw apart. This divergency, in turn, separates the lateral side walls 22 and causes the outer tongue 41 and the inner tongue 42 to slide, relative to one another, in a die-enlarging direction, as indicated by the broken lines in FIG. 7.

When the outer tongue 41 and the inner tongue 42 reach the positions shown in FIG. 9, the pin shanks 48 and 51 abut both the left hand marginal edges of the slots 46 and 47 of the inner tongue 42 and the right hand marginal edges of the slots 43 and 44 of the outer tongue 41, thereby blocking any further clockwise movement of the outer tongue 41 and counter-clockwise movement of the inner tongue 42.

The geometry of the slots and pins is arranged so that at this maximum enlargement of the die 14, the areal extent of the crescent-shaped die comfortably exceeds the transverse area of the seed-bearing column 13. Deprived of the frictional engagement with the side walls and the positive support of the shark tooth projections 57, where used, the column 13 falls from the die by gravity.

When all six of the seed-bearing columns 13 have been removed from the slice 12, or other shape cut from the watermelon, the piece to be eaten is seed free.

In an embodiment especially favored as an economy model, the slots 43, 44, 46 and 47, the pins 49 and 52 and even the helical spring 29 can be eliminated. Instead, the metal arms and the spring steel die 14 are placed under a neutral tension such that the outer tongue 41 and the inner tongue 42 of the overlapping portion 19 of the die side walls 18 are in a median or base position when at rest. Then, when the tool is to be used, the upper arms 26 and 27 are gripped by the user's fingers and are used to guide and insert the die into the melon to the position shown in FIG. 2, care being taken not to squeeze the upper arms together, which would spread the die, during insertion into the melon.

Upon reaching the position shown in FIG. 2, the fingers are shifted downwardly so as to grasp the lower arms 33 and 34 and lightly squeeze the lower arms so that the die is compressed into firm, gripping contact with the outer walls of the melon column 13. This allows the die and melon column to be withdrawn without premature release of the column.

When the die clears the melon and has been moved into proper position, the fingers are allowed to relax so that the slightly compressed die can expand, under spring urgency, and return to median or base position, thereby releasing the grip of the die and allowing the melon column to fall out of the die by gravity.

What is claimed is:

1. A device for cutting and removing the crescent-shaped, seed-bearing column from the flesh of a sliced watermelon, said device comprising:
   a. a hollow, crescent-shaped die having a cutting edge sized and configured to encompass the seed-bearing column as said die is urged into the watermelon flesh, said die including side walls upstanding from said cutting edge for frictional engagement with the peripheral surface of the seed-bearing column to effect withdrawal of the column concurrently with the removal of said die, said side walls in at least one portion of the perimeter of said side walls being in overlapping and relatively slidable relation in order to contract and enlarge the areal extent of said die between a respective first contracted position in which said side walls engage the seed-bearing column and a second enlarged position in which the seed-bearing column is released from said side walls, said side walls being of spring-steel-like material and in which the spring force urges said side walls toward said first contracted position;

b. a handle including means for opposing the spring force exerted by said side walls and means for urging said side walls toward said second enlarged position; and, c. means for mounting said handle on said die for holding and urging said die into the watermelon flesh in congruent relation with the seed-bearing column.

2. A device as inn claim 1 in which said side walls include a plurality of inward projections to enhance the frictional engagement between said side walls and the peripheral surface of the seed-bearing column to facilitate the withdrawal of the column.

3. A device as in claim 2 in which said projections are of the "shark tooth" variety.

4. A device as in claim 1 in which said spring force opposing means and said side walls urging means includes a crossed-tong having a pair of pivoted upper arms, an arm crossover portion and a pair of lower arms mounted on said side walls in symmetrically opposed locations and removed from the overlapping portion of said side walls.

5. A device for cutting and removing the crescent-shaped seed-bearing column from the flesh of a sliced watermelon, said device comprising:

a. a hollow, crescent-shaped die having a cutting edge sized and configured to encompass the seed-bearing column as said die is urged into the watermelon flesh, said die including side walls upstanding from said cutting edge for frictional engagement with the peripheral surface of the seed-bearing column to effect withdrawal of the column concurrently with the removal of said die, said side walls in at least one portion of the perimeter of said side walls being in overlapping and relatively slidable relation in order to contract and enlarge the areal extent of said die between a respective first contracted position in which said side walls engage the seed-bearing column and a second enlarged position in which the seed-bearing column is released from said side walls.

b. a handle comprising a crossed-tong having a pair of pivoted upper arms, spring means for urging said upper arms toward distended attitude, an arm crossover portion, and a pair of lower arms mounted on said side walls in opposed relation and removed from the overlapped portion of said side walls, said spring means being effective to urge said lower arms and said overlapping portion of said side walls toward said first contracted position of said side walls; and, c. means for mounting said handle on said die for holding and urging said die into the watermelon flesh in congruent relation with the seed-bearing column.

6. A device as in claim 5 including means for limiting the extent of movement of said overlapping portion of said side walls between said first contracted position and said second enlarged position.

7. A device as in claim 6 in which said limiting means includes a plurality of registering slots in said side walls, and a pair of pins, each of said pins including a shank extending through said slots and a head mounted on opposite ends of said shank, said pins being slidable within said slots with said heads restricting the extent of face to face separation of said side walls and with said shank restricting the relative slidable movement therebetween.

* * * * *